United States Patent [19]

van der Lely

[11] 4,095,652
[45] Jun. 20, 1978

[54] IMPLEMENT COUPLING MEMBER

[76] Inventor: Cornelis van der Lely, 7, Bruschenrain, Zug, Switzerland

[21] Appl. No.: 805,028

[22] Filed: Jun. 9, 1977

Related U.S. Application Data

[62] Division of Ser. No. 421,111, Dec. 3, 1973, Pat. No. 4,046,201.

[30] Foreign Application Priority Data

Apr. 12, 1972 Netherlands ............ 7216407

[51] Int. Cl.² ............................ A01B 59/06
[52] U.S. Cl. .................... 172/47; 172/449; 172/59
[58] Field of Search ............. 172/439, 448, 47, 449, 172/59

[56] References Cited

U.S. PATENT DOCUMENTS

| 2,711,036 | 6/1955 | Crenshaw | 172/448 |
| 2,787,847 | 4/1957 | Arps | 172/448 |
| 3,774,689 | 11/1973 | Lely et al. | 172/112 |

FOREIGN PATENT DOCUMENTS 1,275,045  9/1961  France ...................... 172/439

Primary Examiner—Richard J. Johnson
Attorney, Agent, or Firm—Mason, Mason & Albright

[57] ABSTRACT

A cultivating implement has an elongated frame portion and a row of soil working members rotatably mounted on that portion. A coupling member is interconnected at the front of the frame portion for connection to the conventional three-point lifting links of a tractor. The lower two points are formed by spaced apart pairs of plates that have forward slots through which a rod is passed and the lower two links are connectable to the rod. Each pair of plates has offset upper and lower apertures which can be aligned with holes in respective vertical plates secured to the top of the frame portion near the front thereof. By selecting the apertures and bolting the pairs of plates to the vertical plates, the position of the soil working members can be chosen. The upper link is connectable to an upper pair of plates at the apex of the coupling member.

7 Claims, 3 Drawing Figures

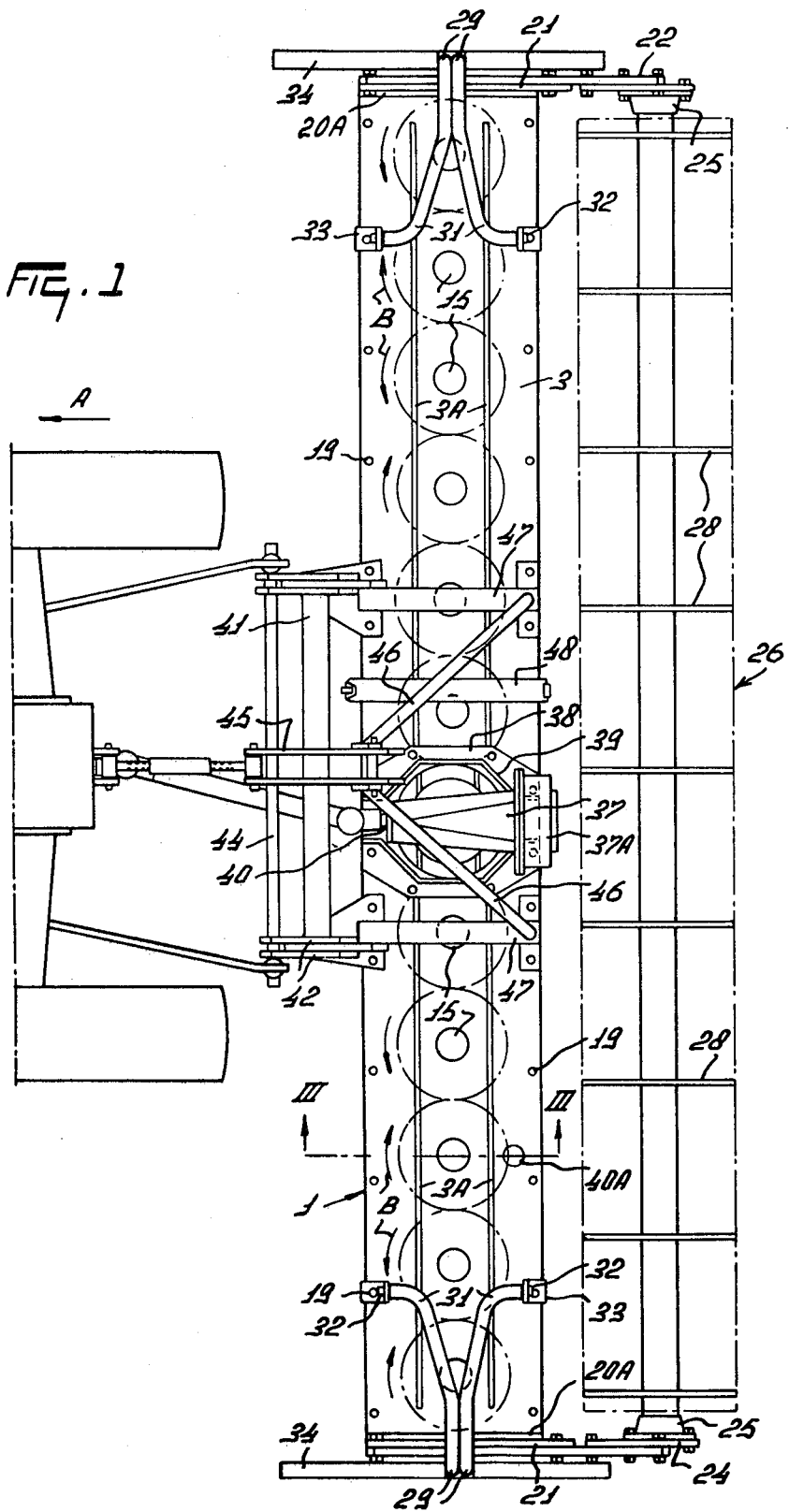

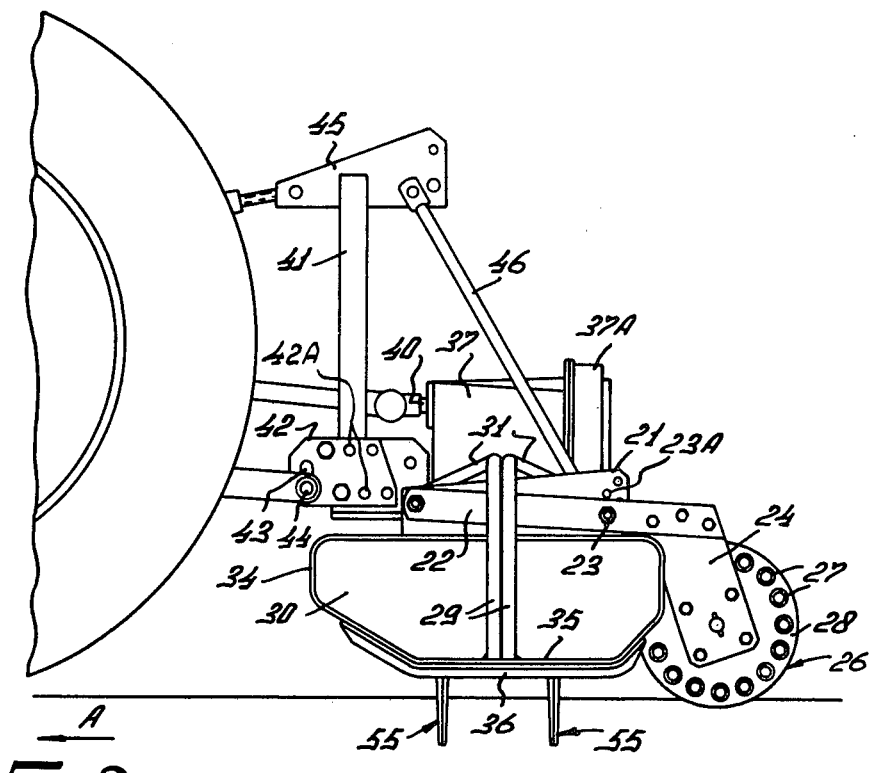
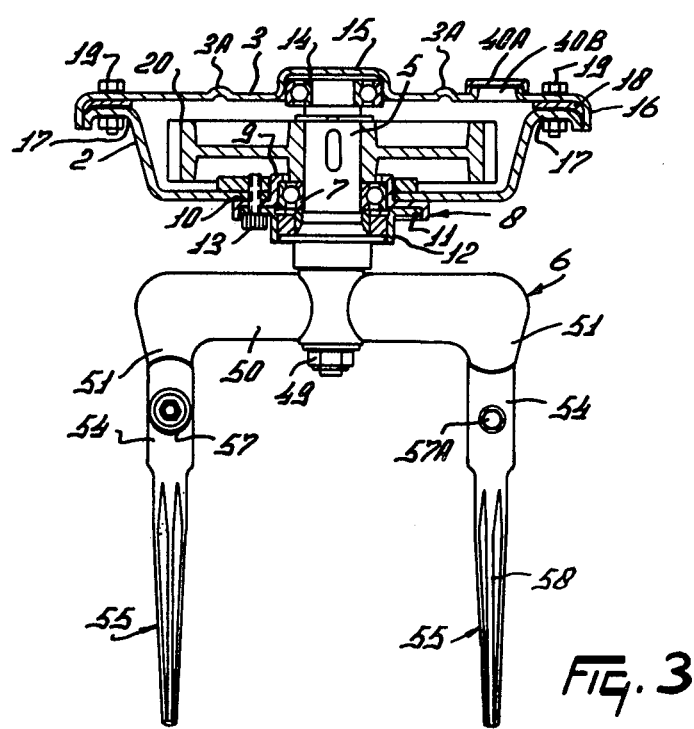

IMPLEMENT COUPLING MEMBER

This application is a division of Ser. No. 421,111 filed Dec. 3, 1973, now U.S. Pat. No. 4,046,201.

This invention relates to soil cultivating implements or rotary harrows, such implements comprising a row of power-driven soil working members or rotors mounted on a frame portion that extends transverse to the direction of normal implement travel.

For a better understanding of the invention, and to show how the same may be carried into effect, reference will now be made, by way of example, to the accompanying drawings, in which:

FIG. 1 is a plan view of a soil cultivating implement or rotary harrow in accordance with the invention connected to the rear of an agricultural tractor, FIG. 2 is a side elevation corresponding to FIG. 1, and FIG. 3 is a section to an enlarged scale taken on the line III—III of FIG. 1.

Referring to FIGS. 1 to 3 of the drawings, the soil cultivating implement or rotary harrow that is illustrated has a frame portion 1 that extends substantially horizontally transverse, and normally substantially perpendicular, to the intended direction of operative travel of the harrow which is indicated by an arrow A in FIGS. 1 and 2 of the drawings. The frame portion 1 is afforded principally by a beam 2 (FIG. 3) of shallow U-shaped or channel-shaped cross-section whose limbs diverge upwardly away from its base.

The upper edges of said limbs are bent over to form substantially horizontal rims 17 and at least one cover plate 3 is secured to those rims by a number of small vertically disposed bolts 19. A plurality of soil working members or rotors 6 are rotatably mounted beneath the frame portion 1 in a single row so as to be rotatable about corresponding substantially vertical, but at least upwardly extending regularly spaced apart axes. In the particular example which is being described, there are twelve of the soil working members or rotors 6 but it is emphasized that alternative numbers thereof may equally well be provided. The axes of rotation of the soil working members or rotors 6 are afforded by corresponding substantially vertical or at least upright rotary shafts 5, said shafts 5 being mounted in lower ball bearings 7 carried in housing 8 that are received in openings or recesses in the bottom of the beam 2. Each housing 8 comprises an upper substantially horizontal portion 9 formed from sheet material that fits in the corresponding opening or recess in the beam 2, a lower substantially horizontal rim-like portion and a substantially vertically bent-over circumferential lip that projects downwardly from the outermost edge of the portion 10. The lip which has just been mentioned closely surrounds a substantially horizontal rim 11 at the upper edge of a housing portion 12 that is also formed from sheet material. The housing portions 9 and 12 are secured in place, and to one another, by small substantially vertically disposed bolts 13 and, since said portions 9 and 12 are formed from sheet matierial, the housings 8 are of inexpensive construction and can be removed and replaced quickly and easily when access to one or more bearings 7 is required for maintenance or replacement purposes.

The upper ends of the shafts 5 are received in corresponding ball bearings 14, each bearing 14 being arranged in an individual housing 15 whose walls are integral with the cover plate 3 or corresponding cover plate 3. It can be seen from FIG. 3 of the drawings that the cover plate 3 is formed with rims 16 that are shaped to fit the previously mentioned rims 17 of the limbs of the beam 2, a gasket or packing 18 being interposed between the rims 16 and 17 and being maintained in position between those rims by the bolts 19. The or each cover plate 3 is formed with a pair of stiffening ribs 3A, said ribs 3A extending lengthwise of the or each plate 3 (i.e. perpendicular or transverse to the direction A) in parallel spaced apart relationship. The employment of the rims 16 and 17 and the stiffening ribs 3A gives the frame portion 1 sufficient rigidity even when sheet material having a thickness of less that 3 mm is employed. Fewer of the bolts 19 are required and a saving in weight is produced without any reduction in strength.

Each of the shafts 5 is provided, inside the hollow beam 2, with a corresponding straight- or spur-toothed pinion 20, said pinions 20 being disposed in such a way that the teeth of each pinion are in mesh with those of its neighbor, or both of its neighbors, in the single row thereof. The perpendicular distance between the longitudinal axes (axes of rotation) of neighboring shafts 5 should not be greater than 30 cm and it is preferred that it should have a magnitude of substantially 25 cms. The opposite lateral sides or ends of the hollow beam 2 are closed by substantially vertical plates 20A to which plates further substantially sector-shaped plates 21 are fastened. Arms 22 are mounted alongside the plates 21 so as to project rearwardly beyond the plates 21 with respect to the direction A and so as to be turnable upwardly and downwardly with respect to the plates 21, and thus with respect to the frame portion 1, about substantially horizontally aligned pivots located at the tops and fronts of the plates 21 with respect to the direction A. Rearmost portions of the plates 21 with respect to the direction A have a substantial vertical extent and are formed with a plurality of holes 23A any chosen one of which can be brought into register with a single hole in the corresponding arm 22 by turning that arm to an appropriate angular setting about the axis of its pivotal mounting at the front of the corresponding plate 21. Substantially horizontal bolts 23 are provided for entry through the single holes in the arms 22 and the chosen holes 23A in the plates 21 to retain said arms 22 in corresponding angular settings about the substantially coincident pivotal axes of the mountings that have just been mentioned. The rearmost ends of the arms 22 with respect to the direction A carry supports 24 that project downwardly from those ends and rearwardly with respect to the direction A. A soil compressing member in the form of a ground roller 26 is rotatably mounted between the two supports 24 with the aid of horizontal bearings 25, said rollers 26 comprising a central axial shaft carrying a plurality, such as nine, of substantially vertical plate-like supports 28 of substantially circular configuration that are spaced apart from one another at regular intervals. The periphery of the roller 26 is provided with a plurality, such as 18, of elongated elements 27 that are entered through holes in the supports 28 in such a way as to be turnable in those holes and readily detachable therefrom. Small transverse "safety" pins or other simple releasable fastenings may be employed for this purpose. The elements 27 may extend parallel to the axis of rotation of the roller 26 or may be wound helically therearound to a greater or lesser extent. In the embodiment which is illustrated, each element 27 is of tubular construction but, as an alternative, said elements 27 may be of solid rod-like formation.

Shield plates 30 that are normally substantially vertically disposed and that normally extend substantially parallel to the direction A are arranged alongside the opposite lateral sides or ends of the row of soil working members or rotors 6 just beyond the plates 20A and 21. Each shield plate 30 is fastened to a corresponding pair of arms 29 and it will be seen from FIGS. 1 and 2 of the drawings that first portions of said arms 29 that are fastened to the plates 30 bear against one another and extend substantially vertically upwards in parallel and abutting relationship with the plates 30 concerned. The arms 29 project upwardly beyond the top edges of the plates 30 for a distance and are then bent over through substantially 90° towards the center of the frame portion 1. At a distance inwardly towards that center from the bend, the two arms 29 of each pair start to diverge and the ends thereof that are remote from the plates 30 are bent over to form end portions 31 with each pair of end portions 31 extending in aligned opposite directions that are substantially horizontally parallel to the direction A. The arms 29 are of tubular formation and the extremities of their end portions 31 are received turnably around stub shafts 32 that are secured to upright limbs of angular lugs 33 which have horizontal limbs that are fastened to the top or tops of the plate or plates 3 by corresponding appropriately positioned bolts 19. Each shield plate 30 is thus turnable upwardly and downwardly about a substantially horizontal axis, extending substantially perpendicular to the direction A, that coincides with the aligned longitudinal axes of the corresponding pair of stub shafts 32. The hollow end portions 31 of the tubular arms 29 that turnably receive the stub shafts 32 constitute very simple and inexpensive bearings for the pivotably mounted shield plates 30.

Each shield plate 30 is formed around its circumference with a corresponding transverse, and normally perpendicular, rim 34 that projects outwardly from the corresponding plate 30 with respect to the center of the frame portion 1. It can be seen from FIG. 2 of the drawings that each rim 34 includes, along the lowermost edge of the corresponding plate 30, a ground-engaging portion 35 whose rearmost end terminates in an upwardly, and rearwardly with respect to the direction A, inclined portion and whose leading end terminates in an upwardly, and forwardly with respect to the direction A, inclined portion, the last mentioned portion being inclined to the horizontal at a smaller angle than the portion at the rear end of the ground-engaging portion 35. The bottom of each ground-engaging portion 35 is provided with a corresponding rib or runner 36, said rib or runner 36 being substantially coplanar with the corresponding plate 30 and having leading and rearmost end regions that are bent over to match the portions of the rims 34 that have just been described and that lie at opposite ends of the ground-engaging portion 35 of that rim 34. The provision of the ribs or runners 36 enables the shield plates 30 to slide over the ground surface during the operation of the harrow in relatively stable positions and brings wear upon the lowermost edges of said plates 30 and the ground-engaging portions of their rims 34 to a minimum. The ribs or runners 36 are releasably secured to the rims 34 to enable them to be replaced when this eventually becomes necessary after inevitable wear has occurred. The height of the ribs or runners 36 is such that they do not interfere with the upward and downward pivotal movements of the plates 30 in any way and it will be noted from FIG. 2 of the drawings that the extreme leading and rearmost ends of each rib or runner 36 with respect to the direction A are bevelled.

The soil working members or rotors 6 are rotated, during the use of the implement or harrow, by a drive transmission which includes parts contained within a gear box 37 that is located, when the implement or harrow is viewed from the rear in the direction A, slightly to the left of the center of the frame portion 1 above the sixth soil working member or rotor 6 counting from the lefthand end of the single row thereof under the conditions just mentioned. A substantially horizontal plate 38 is arranged on top of the cover plate or plates 3 and is provided with an upright rim 39 which substantially surrounds the gear box 37. Owing to the provision of the rim 39, the plate 38 may be formed from thinner material than would otherwise be necessary so that there is a saving in weight and the shaping of the plate 38 is facilitated. The shaft 5 that corresponds to the soil working member or rotor 6 above which the gear box 37 is mounted is extended upwardly into that gear box, the extension carrying a bevel pinion whose teeth are in mesh with those of a further bevel pinion carried by a shaft (not visible) that extends substantially horizontally parallel to the direction A. The rearmost end of the shaft which has just been mentioned extends into a change-speed gear 37A by which it can be connected to a further overlying and parallel substantially horizontal shaft 40 by alternative toothed pinions that can give a number, such as four, of different transmission ratios depending upon their relative arrangement. It is not necessary to describe the construction and arrangement of the change-speed gear 37A in further detail for the purposes of the present invention. As can be seen in FIGS. 1 and 2 of the drawings, the leading end of the upper substantially horizontal shaft 40 that extends substantially parallel to the direction A projects from the front of the gear box 37 where it is splined or otherwise keyed to enable it to be placed in driven connection with the power take-off shaft of an agricultural tractor or other operating vehicle by means of an intermediate telescopic transmission shaft of a construction that is known per se having universal joints at its opposite ends. The change-speed gear 37A is adjusted to give a speed of revolution of the soil working members or rotors 6 in response to a more or less constant speed of rotation of the power take-off shaft of the operating tractor or other vehicle that is appropriate to the particular operation that is to be carried out, the nature of the soil that is to be worked and factors such as the moisture content of the soil. The cover plate 3, or one of the cover plates 3, is formed with a lubricant filling opening 40B, said opening being provided with a removable cap or plug 40A formed from a synthetic plastics material. In the operation of the soil cultivating implement or rotary harrow, the hollow interior of the beam 2 is partially filled with oil so that the pinions 20 are substantially constantly immersed in an oil bath.

The front of the frame portion 1 with respect to the direction A has a coupling member or trestle 41 of generally triangular configuration secured to it, said coupling member or trestle being employed in connecting the frame portion 1 to the three-point lifting device or hitch at the rear of an operating agricultural tractor or other vehicle. The coupling member or trestle 41 is provided, at substantially the same level as the frame portion 1, with two pairs of substantialy vertical plates 42 which are formed at their fronts with respect to the direction A with substantially vertical slots 43. A substantially horizontal rod 44 that extends perpendicular, or at least transverse, to the direction is entered through all four of the slots 43 and the opposite ends of said rod that project beyond the furthest remote plates 42 constitute coupling points to which the free ends of the lower lifting links of the three-point lifting device or hitch of an operating agricultural tractor or other vehicle are pivotally connected in the manner shown in outline in FIGS. 1 and 2 of the drawings. The purpose of slots 43 is to receive attachment rod 44 which can move in the slots so that the implement can develop "play" during operation relative to the tractor. It will be appreciated that due to uneven ground, the implement can pivot about an axis that extends in the direction of travel. The apex of the coupling member or trestle 41 is provided with a pair of substantially vertical plates 45 that both extend substantially parallel to the direction A in closely spaced apart relationship. As shown in the drawings, the free end of the upper adjustable lifting link of the three-point lifting device or hitch of the operating agricultural tractor or other vehicle is pivotally mounted between the two plates 45. Rear regions of the two plates 45 with respect to the direction A are coupled to the upper ends of two tie rods 46 that diverge downwardly, and rearwardly with respect to the direction A, away from said plates 45, the lowermost and rearmost ends of said tie rods 46 being fastened to strengthening beams 47 that extend substantially horizontally parallel to the direction A on top of the cover plate or plates 3. The leading ends of the beams 47 are connected to substantially vertical plates sandwiched between the two pairs of similarly disposed plates 42. A box 48 that may conveniently store tools, spare parts and the like is located at one side of the gear box 37 on top of the plates or plates 3 and between the strengthening beams 47, said box 48 is preferably being provided with a pivotable lid that can be retained closed in the simple manner which can be seen in outline in FIG. 1 of the drawings. Each of the plates 42 is formed with a plurality, such as three, of pairs of upper and lower holes 42A so that said plates can be releasably fastened by bolts to the vertical plates that are sandwiched between them in any chosen positions corresponding to the use of single pairs of the holes 42A, said positions being more or less advanced with respect to the direction A as compared with the frame portion 1.

The lowermost end of each shaft 5 that projects from beneath the frame portion 1 is splined or otherwise keyed and has a lowermost screwthreaded extremity. Corresponding wrought-iron tine supports 50 (FIG. 3) formed with central matchingly splined or otherwise keyed holes are fastened to said ends of the shafts 5 by entering those ends through the holes which have just been mentioned and maintaining the connections with the aid of nuts 49 that co-operate with the screwthreads referred to above. The opposite ends of each tine support 50 are bent over downwardly to form portions 51 that extend substantially parallel to the axis of the corresponding shaft 5 but that are actually inclined to the vertical by a few degrees (when the axis of the corresponding shaft 5 is strictly vertically disposed) so as to trail rearwardly to a small extent with respect to the intended direction of rotation B (FIG. 1) of the soil working member or rotor 6 concerned. Each bent-over portion 51 comprises a milled holder 52 that is entered into a substantially matchingly shaped recess or cavity in an upper fastening portion 54 of a tine 55.

Each tine fastening portion 54 is formed through its walls with diametrically opposed holes that are aligned in a direction perpendicular to the length of the portion 54. One of each pair of the holes that have just been mentioned is surrounded by a projecting rim 57 and the other hole of each pair is recessed, the recess having a hexagonal or other shape that fits the head of a transverse fastening bolt 57A that is entered through both said holes and through an aligned transverse bore in the holder 52. A nut that co-operates with the screwthreaded shank of the bolt 57A is received inside the rim 57 where it can be tightened or loosened easily by a box spanner as described in Ser. No. 421,111.

In the use, the coupling member or trestle 41 is connected to the three-point lifting device or hitch of an operating agricultural tractor or other vehicle and the projecting leading end of the shaft 40 is placed in driven connection with the power takeoff shaft of the same tractor or other vehicle by way of an intermediate telescopic transmission shaft of a construction that is known per se having universal joints at its opposite ends. Upon operative travel over a field, the drive that is imparted to the shaft 40 causes the soil working members or rotors 6 to revolve in the directions B that are shown in FIG. 1 of the drawings. The perpendicular distance between the lowermost free ends or tips of the two tines of each member or rotor 6 is slightly greater than the perpendicular distance between the axes of rotation of immediately neighboring shafts 5 so that the individual strips of soil that are worked by the various members or rotors 6 overlap to produce, in effect, a single broad strip of worked soil. The working depth of the tines in controlled by engaging the bolts 23 in appropriate holes 23A in the plates 21. This governs the level of the axis of rotation of the roller 26 with respect to the remainder of the implement or harrow and consequently controls the maximum depth to which the tines can penetrate into the soil.

Although various features of the soil cultivating implement or harrow and tines and tine mountings that have been described and/or illustrated in the accompanying drawings will be set forth in the following claims as inventive features, it is emphasized that the invention is not necessarily limited to those features and that it includes within its scope every part of the soil cultivating implement or rotary harrow and each tine and tine mounting that has been described and/or illustrated both individually and in various combinations.

What we claim is:

1. A soil cultivating implement comprising a frame and a plurality of soil working members rotatably mounted on upwardly extending axes, said members being supported along the length of an elongated frame portion that extends transverse to the direction of travel, a coupling member interconnected to said frame portion and positioned at the front thereof for coupling the implement to a three-point hitch of a tractor, said coupling member comprising an upper coupling point and two spaced apart lower coupling points, each lower point comprising a pair of upright apertured plates that are separated from one another and a respective vertical plate on said frame portion extending between said pair of plates, said vertical plate having a hole in alignment with any of the apertures in said pair of plates, bolt means being passed through each pair of plates and respective vertical plate, and the relative position of of the frame portion to said coupling member being changeable in both vertical and horizontal directions.

2. A soil cultivating implement as claimed in claim 1, wherein all of said plates extend forwardly from the frame portion, in the general direction of travel.

3. A soil cultivating implement comprising a frame and a plurality of rotatable soil working members, said members being supported along an elongated frame portion that extends transverse to the direction of travel, a coupling member interconnected to said frame portion and positioned at the front thereof for coupling the implement to a three-point hitch of a tractor, said coupling member comprising an upper coupling point and two spaced apart, lower coupling points, each lower point comprising at least one plate and at least one of the plates being fixed to a connector on said frame portion in any one of a number of different connections, said connections changing the relative positions of the coupling member and the frame portion, both vertically, said plates extending forwardly from said frame portion in the different connections with respect to the direction of implement travel, said plates having a number of apertures arranged one above the other and along the horizontal lengths of those plates, said connector having holes and being secured on top of said frame portion, releasable bolts interconnecting said coupling member to the frame portion and said bolts being passed through matching apertures and holes, the uppermost apertures being more advanced with respect to the direction of travel than the lower apertures.

4. A soil cultivating implement as claimed in claim 3, wherein said soil working members are rotatable about respective upwardly extending axes and each lower coupling point includes a pair of plates with aligned apertures.

5. A soil cultivating implement comprising a frame and a plurality of soil working members rotatably mounted on upwardly extending axes, said members being supported along an elongated frame portion that extends transverse to the direction of travel, a coupling member interconnected to said frame portion and positioned at the front thereof for coupling the implement to a three-point hitch of a tractor, said coupling member comprising an upper coupling point and two spaced apart, lower coupling points, said lower points each comprising a pair of separated apertured plates and at least one pair of plates being fixed to a connector on said frame portion in any one of a number of different connections, said connections changing the relative positions of the coupling member and frame portion, both vertically and horizontally, said pairs of plates extending forwardly from said frame portion in the different connections with respect to the direction of implement travel, and a respective connector plate on the top of said frame portion being sandwiched between said one pair of plates.

6. A soil cultivating implement as claimed in claim 5 wherein each connector plate is affixed to the top of said frame portion in a vertical position.

7. A soil cultivating implement comprising a frame and a plurality of rotatable soil working members, said members being supported along an elongated frame portion that extends transverse to the direction of travel, a coupling member interconnected to said frame portion and positioned at the front thereof for coupling the implement to a three-point hitch of a tractor, said coupling member comprising an upper coupling point and two spaced apart, lower coupling points, each lower point comprising at least one plate and at least one of the plates being detachably secured to a connector fixed to said frame portion in any one of a number of different connections, said different connections changing the relative positions of the coupling member to the frame portion, both vertically and horizontally, said plates extending more or less forwardly from said frame portion in the different connections with respect to the direction of implement travel, the forward portions of said plates having upwardly extending slots and the two lower links of said three-point hitch being connected to a rod that extends through said slots.

* * * * *